Oct. 10, 1950 J. R. BOYKIN ET AL 2,525,475

RADIO APPARATUS

Filed July 22, 1948 2 Sheets-Sheet 1

WITNESSES:
Edward Michaels
Wm. C. Groome

INVENTORS
John R. Boykin &
John L. Johnson.
BY
F. E. Browder
ATTORNEY

RADIO APPARATUS

Filed July 22, 1948 2 Sheets-Sheet 2

WITNESSES:

Edward Michaels

Wm. C. Groome

INVENTORS

John R. Boykin &

John L. Johnson.

BY

F. E. Browder

ATTORNEY

Patented Oct. 10, 1950 2,525,475

UNITED STATES PATENT OFFICE 2,525,475

RADIO APPARATUS

John R. Boykin, Glen Burnie, and John L. Johnson, Catonsville, Md., assignors to Westinghouse Electric Corporation, East Pittsburgh, Pa., a corporation of Pennsylvania Application July 22, 1948, Serial No. 40,095

10 Claims. (Cl. 332—25)

This invention relates to frequency modulation, radio broadcast systems.

In frequency modulation, radio broadcast systems, it is necessary that the average carrier frequency always be maintained at the same assigned value. The usual crystal controlled oscillator circuits cannot be used for this purpose for the reason that it has not been possible to frequency modulate a crystal controlled oscillator. The method used in one well-known system for maintaining the average carrier frequency of a frequency modulation system at its assigned value, has been to amplitude modulate the output of one crystal controlled oscillator operating at a relatively low radio frequency, to change the amplitude modulation to phase modulation, and then to change the phase modulation to frequency modulation. The frequency of the frequency modulated signal is multiplied, then beat down with the output of a second crystal controlled oscillator for control of the carrier frequency, and then is multiplied again for producing the desired improvement in signal to noise ratio. Disadvantages of such a system are its complications, the distortion produced, and the use of a large number of frequency multiplier stages.

The invention provides a frequency modulation system in which the output frequency is controlled directly by a crystal controlled oscillator, and in which the modulating frequencies are added directly to the output of the oscillator.

In one embodiment of the invention, a phase-shifting network is connected to the output of a crystal controlled oscillator so as to provide quadrature voltages at the oscillator frequency and differing in phase from each other by 90°. A mixer system combines the quadrature voltages from the phase-shifting network with quadrature voltages from a sideband generator, the combined voltages being supplied through conventional radio frequency multipliers and/or amplifiers to a radiating antenna. The audio frequency for modulation is fed through an integrating network into the sideband generator which develops modulating frequencies, 90° apart in phase, which are fed in quadrature to the mixer system.

A feature of this invention is that a cathode ray tube is used to generate the sideband frequencies which are supplied to the mixer system. In one embodiment of the invention, a cathode ray tube having conventional vertical and horizontal deflecting plates is used, four sine-wave segments, 90° apart in phase, being used as targets, each target being connected to its corresponding mixer of the mixer system.

In another embodiment of the invention, a conventional cathode ray tube is used as a side-band generator, the screen of the tube having a mask with four sine-wave cutouts, 90° apart in phase, the light from the cutouts being focused upon four corresponding photoelectric cells which supply sideband voltages to corresponding mixers of the mixer system.

An object of the invention is to reduce distortion in a frequency modulation, radio broadcast system.

Another object of the invention is to reduce the number of frequency multiplier stages in a frequency modulation, radio broadcast system.

Another object of the invention is to control the carrier frequency of a frequency modulation system by a crystal controlled oscillator, and to add the modulating frequencies directly to the output of the oscillator.

Another object of the invention is to use a cathode ray tube as a sideband generator for a frequency modulation, radio broadcast system.

The invention will now be described with reference to the drawings of which:

Figure 1:
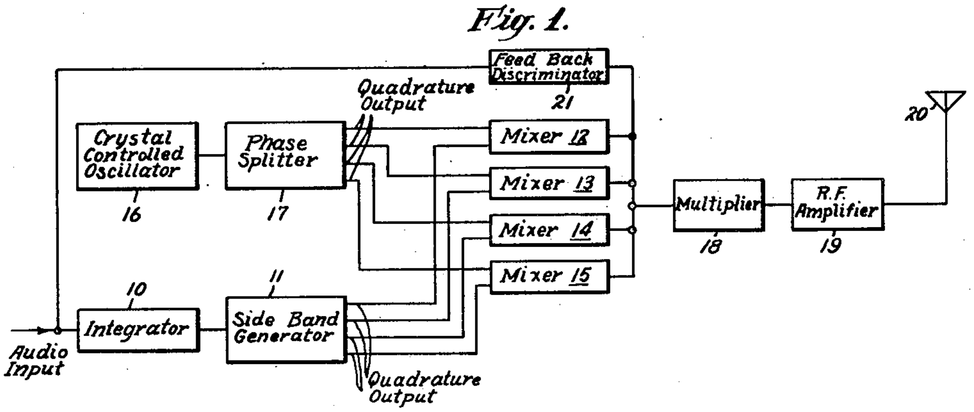
Fig. 1 is a circuit schematic of a frequency modulation, radio broadcast system embodying this invention.
Figure 3:
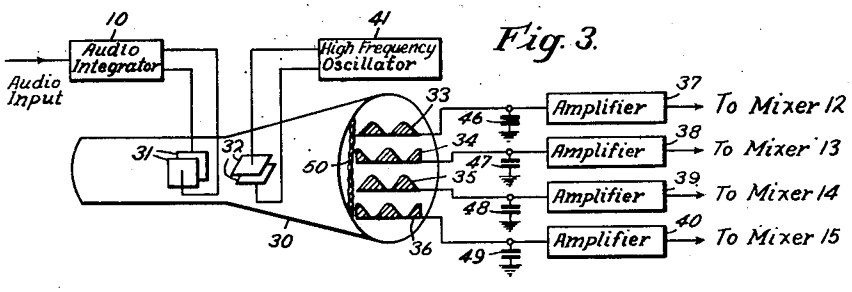
Fig. 3 is a diagrammatic view illustrating a sideband generator including one form of a cathode ray tube which may be used in the system of Fig. 1.
Figure 4:
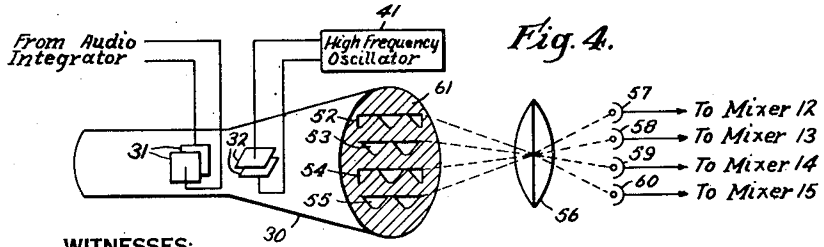
Fig. 4 is a diagrammatic view illustrating a side-band generator including another form of cathode ray tube with associated photoelectric cells, which may be used in the system of Fig. 1.

Referring now to Fig. 1 of the drawings, a source of audio frequency currents is supplied through the conventional audio integrator 10 into the sideband generator 11, one form of which is illustrated by Fig. 3, and another form of which illustrated by Fig. 4. The generator 11 supplies audio frequency currents which are similar, except they are 90° apart in phase, to the mixers 12, 13, 14, and 15. Thus, a current which is in phase with the signal into the generator 11, and which may be said to be 0° out of phase therewith, is supplied into the mixer 12, a current which is 90° out of phase with that supplied to the mixer 12 is supplied to the mixer 13, a current which is 180° out of phase with that supplied to the mixer 12 is supplied to the mixer 14, and a current which is 270° out of phase with that supplied to the mixer 12 is supplied to the mixer 15.

Figure 2:
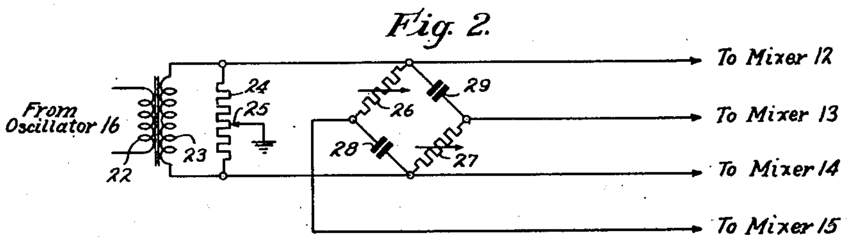
Fig. 2 is a circuit schematic of a more or less conventional, phase-shifting circuit which may be used in the system of Fig. 1.

A conventional, crystal controlled oscillator 16 supplies currents at a frequency which may, for example, be 5 megacycles, into the phase splitter 17, the details of which are illustrated by Fig. 2. The phase splitter supplies currents from the oscillator 16 to the mixers 12, 13, 14, and 15, which are similar but which are 90° apart in phase. Thus the oscillator current to the mixer 13 is 90° out of phase with that supplied to the mixer 12; the oscillator current supplied to the mixer 14 is 180° out of phase with that supplied to the mixer 12, and the oscillator current supplied to the mixer 15 is 270° out of phase with that supplied to the mixer 12. The currents supplied by the sideband generator 11 to the mixers may be said to be quadrature currents as may the currents supplied by the phase splitter to the mixers, since they differ in phase from each other by 90°.

The mixers 12, 13, 14, and 15 may be of the type disclosed in the co-pending application of Cyril E. McClellan, Serial No. 775,122.

The mixers 12, 13, 14, and 15 are connected together at their output sides, and their output current is supplied through the conventional frequency multiplier 18 and the conventional radio frequency amplier 19 to the conventional transmitting antenna 20. The frequency multiplier 18 may consist of one doubler and two tripler stages for increasing the frequency from 5 megacycles to 90 megacycles.

A portion of the output current of the mixers is supplied through the conventional feed-back discriminator 21 to the input of the audio integrator 10 for correcting for any distortion.

The sideband generator 11 develops the modulating frequencies which are fed in quadrature to the mixers 12, 13, 14, and 15 to which the carrier wave of the oscillator 16 is fed in quadrature, so that the carrier wave is frequency modulated.

Referring now to Fig. 2, one form of phase splitter which may be used in the practice of the invention will now be described. The output of the crystal controlled oscillator is supplied to the primary winding 22 of a coupling transformer, the secondary winding 23 of which, has the potentiometer 24 bridged thereacross, the slider 25 of the potentiometer being grounded. The resistors 26 and 27 are connected in two opposite legs of a bridge circuit shunted across the secondary winding 23, and the capacitors 28 and 29 are connected in the other leg of the bridge circuit, so that currents, 90° apart in phase, are supplied to the mixers 12, 13, 14, and 15. The slider 25 of the potentiometer 24 may be adjusted to vary the strength of the current supplied to the bridge circuit.

One form of sideband generator which may be used is illustrated by Fig. 3. The cathode ray tube 30 has the conventional horizontal sweep deflector plates 31 and the conventional vertical sweep deflector plates 32, but has, instead of the conventional target screen, the four, metal sine-wave segments 33, 34, 35, and 36, spaced apart and superimposed one above the other in the path of the electron stream from the cathode of the tube. The segments are so shaped and placed that there is a 90° phase shift between adjacent segments, the segment 34 being 90° out of phase with the segment 33, the segment 35 being 180° out of phase with the segment 33, and the segment 36 being 270° out of phase with the segment 33. The phase shift is such that the phase advances from the upper-most segment to the one underneath it and from the segment underneath the upper-most segment to the segment underneath it, and so on.

The segments 33, 34, 35, and 36 are connected through the conventional, direct current amplifiers 37, 38, 39, and 40, respectively, to the inputs of the mixers 12, 13, 14, and 15, respectively.

The horizontal sweep plates 31 of the cathode ray tube 30 are connected to the output of the audio integrator 10, and its vertical sweep plates 32 are connected to the high-frequency oscillator 41, which, for example, may provide a sweep frequency of 50 megacycles.

The frequency of the sine wave comprising each segment is determined from the lowest modulating frequency and from the maximum frequency swing desired. If, for example, the maximum modulation is plus 100 kc. at the output frequency, and a multiplication factor of 20 is used, then the deviation is 100 kc. which is equal to plus 5,000 cycles at the modulation frequency. If the lowest modulation frequency is 50 cycles per second, then:

$$\frac{5000}{50}=100 \text{ radians}$$

Sine wave frequency=

$$\frac{100}{2\pi}=$$

approximately 16 cycles per second.

The sweep frequency is so chosen that the sweep is effectively a vertical line which sweeps back and forth across the segments at a rate controlled by the integrated audio currents. The low-pass filter capacitors 46, 47, 48, and 49 may be connected between the outputs of the segments and ground, for providing that the vertical sweep lines have knife edges, and should have cutoff frequencies of not more than 200 kc.

The cathode beam of the cathode ray tube sweeps back and forth across the sine-wave segments, and the electrons collected by each segment produce currents having the wave forms of the segments, which currents are supplied to the mixers.

The outputs taken from the four sine-wave segments are sideband currents, which have phase relationships with each other of 0°, 90°, 180°, and 270°, and which are mixed, as described in the foregoing, with the quadrature oscillator currents for frequency modulating the carrier wave provided by the oscillator.

Figure 8:
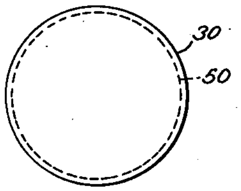
Fig. 8 is an end view of the cathode ray tube of Figs. 3 and 5 and illustrates in dashed-line outline the end plate used therein.
Figure 9:
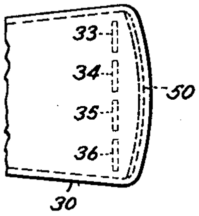
Fig. 9 is a fractional side elevation of the tube of Fig. 7 and illustrates in dashed-line outlines the sine-wave segments and the end plate used therein.

The ends of the sine-wave segments may be sealed to the wall of the tube 30 for supporting the segments. The circular, metal collector plate 50, a portion of which is illustrated by Fig. 3, may be spaced from the backsides of the segments and used for collecting the electrons which miss the segments, and may be grounded as is the screen of a conventional cathode ray tube, for returning the electrons to the power pack which is not illustrated. Figs. 8 and 9 illustrate the relative positions of the plate 50 and the sine-wave segments.

Fig. 4 illustrates another form of sideband generator that may be used, and which employs a conventional cathode ray tube having a fluorescent screen on which a mask 61 is cemented, or otherwise suitably secured. The mask has the sine-wave segments 52, 53, 54, and 55 cut therefrom, and which correspond to the segments 33, 34, 35, and 36 described in the foregoing in connection with Fig. 3 and which are similar thereto, except they are inverted.

The light through the sine-wave segments 52, 53, 54, and 55 is focused by the lens 56 on the cathodes of the photoelectric cells 57, 58, 59, and 60, respectively, which preferably are of the multiplier type, so that their anodes can be connected directly to the mixers 12, 13, 14, and 15, respectively.

As in the case of Fig. 3, the outputs taken from the sine-wave segments of Fig. 4 are sideband currents which have phase relationships with each other of 0°, 90°, 180°, and 270°, and which are mixed, as described in the foregoing, with the quadrature oscillator currents for frequency modulating the carrier wave of the oscillator.

Figure 5:
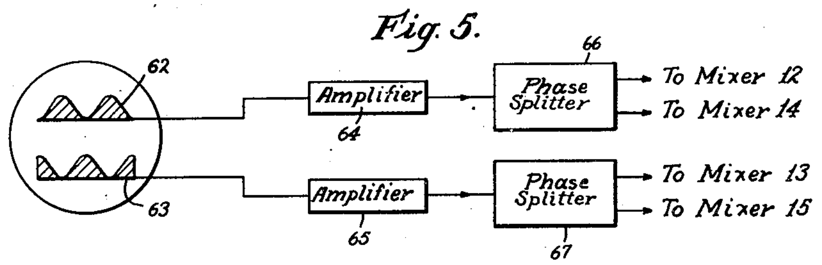
Fig. 5 is a diagrammatic view illustrating a modification of the sideband generator of Fig. 3.

Fig. 5 illustrates a modification of the sideband generator of Fig. 3, in which but two sine-wave segments, 62 and 63, 90° apart in phase, are used. The segment 62 is connected to the amplifier 64, the output of which is split into two currents, 180° apart in phase, in the phase splitter 66, one current being supplied to the mixer 12, and the other to the mixer 14. The segment 63 is connected to the amplifier 65, the output of which is split into two currents, 180° apart in phase, in the phase spliter 67, one current being supplied to the mixer 13, which current is 90° in phase from the current supplied to the mixer 12, and the other current being supplied to the mixer 15 which is 270° in phase from the current supplied to the mixer 12, as in Fig. 3. Thus, four quadrature currents are supplied to the mixers in their proper phase relationship.

Figure 7:
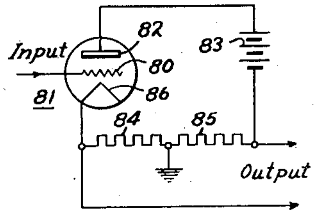
Fig. 7 is a circuit schematic of a phase-shifting circuit which may be used with the modifications of Figs. 5 and 6.

The phase spliters 66 and 67 may be of the type illustrated by Fig. 7, in which each of the sine-wave segments 62 and 63 woul. be connected to the control grid 80 of a vacuum tube 81, the plate 82 of the tube being connected to the positive terminal of the plate voltage battery 83. The resistors 84 and 85 are connected in series between the negative terminal of the battery and the cathode 86 of the tube. The mid-point connection of the resistors is grounded. The output connections carry currents which are 180° apart in phase.

Figure 6:
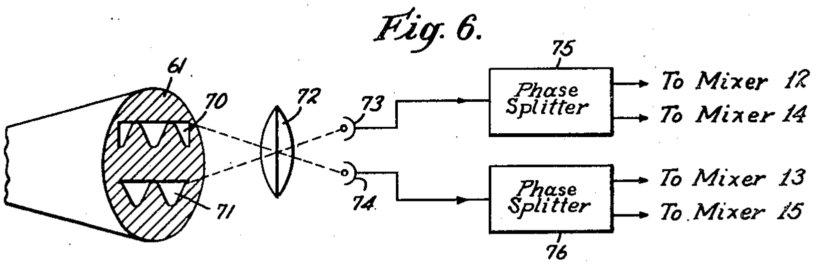
Fig. 6 is a diagrammatic view illustrating a modification of the sideband generator of Fig. 4.

Fig. 6 illustrates a modification of the sideband generator of Fig. 4, in which but two sine-wave, cutout segments 70 and 71, 90° apart in phase, are used. The light through the segments is focused by the lens 72 on the photo-electric cells 73 and 74. The current from the cell 73 is split in the phase splitter 75 into two currents, 180° apart in phase, one current being supplied to the mixer 12, and the other to the mixer 14. The current from the cell 74 is split in the phase splitter 76 into two currents, 180° apart in phase, one current being supplied to the mixer 13, and the other to the mixer 15. Thus, four quadrature currents are supplied to the mixers in their proper phase relationship. The splitters 75 and 76 may be of the type illustrated by Fig. 7, the anode of each photoelectric cell being connected to a grid of a phase-splitter tube.

Among the advantages of the invention are that direct crystal control of the oscillator providing the carrier wave, is used, and since the crystal controlled oscillator may be operated at a relatively high frequency, (limited only by the number of sine-wave cycles which can be on each of the sine-wave segments of Figs. 3 and 4) relatively few multiplier stages are necessary. The multiplier stages are not critical as to band pass effects; the sidebands are generated without the use of frequency dividers and critical auxiliary oscillators; and the total number of vacuum tubes which are used is substantially less than in conventional, frequency modulation systems.

We claim as our invention:

1. A frequency modulation system comprising an oscillator for producing a carrier wave to be frequency modulated; a phase splitter connected to the output of the oscillator for providing four currents at the oscillator frequency but displaced from each other in phase; a plurality of mixers having their inputs so connected to the output of said phase splitter that each mixer receives one of said currents; means for supplying audio currents to be used for modulating said carrier wave; means including a single cathode ray tube connected to said means for providing sideband currents corresponding in number to, and having the same phase displacement as, said currents from said phase splitter; and means for supplying said sideband currents to the inputs of said mixers.

2. A frequency modulation system comprising an oscillator for producing a carrier wave to be frequency modulated; a phase splitter connected to the output of the oscillator for providing four currents at the oscillator frequency but displaced from each other in phase; a plurality of mixers having their inputs so connected to the output of said phase splitter that each mixer receives one of said currents; means for supplying audio currents to be used for modulating said carrier wave; a single cathode ray tube having cathode beam deflecting means, and having a plurality of spaced, sine-wave segments corresponding in number to, and having the same phase displacement as, said currents from said phase splitter, at the end of said tube opposite its cathode, said first mentioned means being connected to said deflecting means so as to deflect said beam in one direction, a high frequency sweep oscillator connected to said deflecting means so as to deflect said beam in another direction; and means including said segments for supplying sideband currents to the inputs of said mixers.

3. A frequency modulation system comprising an oscillator for producing a carrier wave to be frequency modulated; a phase splitter connected to the output of the oscillator for providing four currents at the oscillator frequency but displaced from each other in phase; a plurality of mixers having their inputs so connected to the output of said phase splitter that each mixer receives one of said currents; means for supplying audio currents to be used for modulating said carrier wave; a single cathode ray tube having cathode beam deflecting means, and having a plurality of spaced, conductive, sine-wave segments corresponding in number to, and having the same phase displacement as, said currents from said phase splitter, in the path of the cathode ray beam, said first mentioned means being connected to said deflecting means so as to deflect said beam in one direction, a high frequency, sweep oscillator connected to said deflecting means so as to deflect said beam in another direction; and means electrically connecting said segments to the inputs of said mixers.

4. A frequency modulation system comprising an oscillator for producing a carrier wave to be frequency modulated; a phase splitter connected to the output of the oscillator for providing four currents at the oscillator frequency but displaced from each other in phase; a plurality of mixers having their inputs so connected to the output of said phase splitter that each mixer receives one of said currents; means for supplying audio currents to be used for modulating said carrier wave; a single cathode ray tube having a fluorescent screen, and having cathode beam deflecting means, said first mentioned means being so connected to said deflecting means as to deflect said beam in one direction, a high frequency, sweep oscillator connected to said deflecting means so as to deflect said beam in another direction; a mask on said screen having a plurality of spaced, cutout, sine-wave segments corresponding in number to, and in phase displacement with, said currents from said phase splitter; a plurality of photo-electric cells corresponding in number to said segments; means for projecting the light from said screen through each of said segments onto its corresponding cell; and means connecting said cells to the inputs of said mixers.

5. A frequency modulation system comprising a crystal controlled oscillator for producing a carrier wave to be frequency modulated; a phase splitter connected to the output of the oscillator for providing four currents at the oscillator frequency but displaced from each other 90° in phase; a plurality of mixers having their inputs so connected to the output of said phase splitter that each mixer receives one of said currents; means for supplying audio currents to be used for modulating said carrier wave; means including a cathode ray tube connected to said means for providing sideband currents corresponding in number to, and having the same phase displacement as, said currents from said phase splitter; and means for supplying said sideband currents to the inputs of said mixers.

6. A frequency modulation system comprising a crystal controlled oscillator for producing a carrier wave to be frequency modulated; a phase splitter connected to the output of the oscillator for providing four currents at the oscillator frequency but displaced from each other 90° in phase; a plurality of mixers having their inputs so connected to the output of said phase splitter that each mixer receives one of said currents; means for supplying audio currents to be used for modulating said carrier wave; a cathode ray tube having cathode beam deflecting means, and having four spaced, sine-wave segments displaced from each other 90° in phase, at the end of said tube opposite its cathode, said first mentioned means being connected to said deflecting means so as to deflect said beam in one direction, a high frequency sweep oscillator connected to said deflecting means so as to deflect said beam in a direction perpendicular to said one direction; and means including said segments for supplying sideband currents to the inputs of said mixers.

7. A frequency modulation system comprising a crystal controlled oscillator for producing a carrier wave to be frequency modulated; a phase splitter connected to the output of the oscillator for providing four currents at the oscillator frequency but displaced from each other 90° in phase; a plurality of mixers having their inputs so connected to the output of said phase splitter that each mixer receives one of said currents; means for supplying audio currents to be used for modulating said carrier wave; a cathode ray tube having cathode beam deflecting means, and having a plurality of spaced, conductive, sine-wave segments displaced from each other 90° in phase, in the path of the cathode ray beam, said first mentioned means being connected to said deflecting means so as to deflect said beam in one direction, a high frequency, sweep oscillator connected to said deflecting means so as to deflect said beam in a direction perpendicular to said one direction; and means connecting said segments to the inputs of said mixers.

8. A frequency modulation system comprising a crystal controlled oscillator for producing a carrier wave to be frequency modulated; a phase splitter connected to the output of the oscillator for providing four currents at the oscillator frequency but displaced from each other 90° in phase; a plurality of mixers having their inputs so connected to the output of said phase splitter that each mixer receives one of said currents; means for supplying audio currents to be used for modulating said carrier wave; a cathode ray tube having a fluorescent screen, and having cathode beam deflecting means, said first mentioned means being so connected to said deflecting means so as to deflect said beam in one direction, a high frequency, sweep oscillator connected to said deflecting means so as to deflect said beam in a direction perpendicular to said one direction; a mask on said screen having a plurality of spaced, cutout, sine-wave segments displaced from each other 90° in phase; a plurality of photoelectric cells; means for projecting the light from said screen through said segments onto said cells; and means connecting said cells to the inputs of said mixers.

9. A frequency modulation system comprising a crystal-controlled oscillator for producing a carrier wave to be frequency modulated; a phase splitter connected to the output of the oscillator for providing four currents at the oscillator frequency but displaced from each other 90° in phase; a plurality of mixers having their inputs so connected to the output of said phase splitter that each mixer receives one of said currents; means for supplying audio currents to be used for modulating said carrier wave; a cathode ray tube having cathode beam deflecting means, and having two spaced conductive, sine-wave segments displaced from each other 90° in phase, in the path of the cathode ray beam, said first-mentioned means being connected to said deflecting means so as to deflect said beam in one direction, a high frequency, sweep oscillator connected to said deflecting means so as to deflect said beam in a direction perpendicular to said one direction; a phase splitter connected to each of said segments for providing from each two currents, 180° apart in phase; and means connecting said last-mentioned phase splitter to the inputs of said mixers.

10. A frequency modulation system comprising a crystal-controlled oscillator for producing a carrier wave to be frequency modulated; a phase splitter connected to the output of the oscillator for providing four currents at the oscillator frequency but displaced from each other 90° in phase; a plurality of mixers having their inputs so connected to the output of said phase splitter that each mixer receives one of said currents; means for supplying audio currents to be used for modulating said carrier wave; a cathode ray tube having a fluorescent screen, and having cathode beam deflecting means, said first-mentioned means being so connected to said deflecting means so as to deflect said beam in one direction, a high frequency, sweep oscillator connected to said deflecting means so as to deflect said beam in a direction perpendicular to said one direction; a mask on said screen having two spaced, cutout sine-wave segments displaced from each other 90° in phase; a pair of photoelectric cells; means for projecting the light from said screen through said segments onto said cells; a phase splitter connected to each of said cells for providing from each two currents, 180° apart in phase; and means connecting said last-mentioned phase splitters to the inputs of said mixers.

JOHN R. BOYKIN.
JOHN L. JOHNSON.

REFERENCES CITED

The following references are of record in the file of this patent:

UNITED STATES PATENTS

| Number | Name | Date |
|---|---|---|
| 2,294,209 | Roder | Aug. 25, 1942 |
| 2,431,569 | Labin | Nov. 25, 1947 |